(12) United States Patent
Fan et al.

(10) Patent No.: US 8,075,070 B2
(45) Date of Patent: Dec. 13, 2011

(54) COMPUTER ENCLOSURE WITH POWER SUPPLY CHASSIS

(75) Inventors: Chen-Lu Fan, Taipei Hsien (TW); Hung-Chieh Chang, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 217 days.

(21) Appl. No.: 12/485,341

(22) Filed: Jun. 16, 2009

(65) Prior Publication Data

US 2010/0259143 A1    Oct. 14, 2010

(30) Foreign Application Priority Data

Apr. 8, 2009  (CN) .......................... 2009 2 0301992

(51) Int. Cl.
*A47B 81/00* (2006.01)
*A47B 97/00* (2006.01)
(52) U.S. Cl. ............. 312/223.2; 312/223.1; 361/679.01; 361/679.02
(58) Field of Classification Search ............... 312/223.2, 312/223.1, 263, 265.5, 265.6; 361/679.01, 361/679.02; 248/27.1, 346.06
See application file for complete search history.

(56) References Cited

U.S. PATENT DOCUMENTS

| | | | | |
|---|---|---|---|---|
| 5,938,303 | A * | 8/1999 | Ho | 312/223.2 |
| 6,246,571 | B1 * | 6/2001 | Lin et al. | 361/679.02 |
| 6,862,174 | B2 * | 3/2005 | Chien et al. | 361/679.33 |
| 7,088,587 | B2 * | 8/2006 | Chen et al. | 361/724 |
| 7,206,197 | B2 * | 4/2007 | Chen et al. | 361/679.02 |
| 7,218,508 | B2 * | 5/2007 | Chen et al. | 361/679.57 |
| 7,911,778 | B2 * | 3/2011 | Merrow | 361/679.37 |
| 2005/0117290 | A1 * | 6/2005 | Chen et al. | 361/686 |
| 2005/0122673 | A1 * | 6/2005 | Chen et al. | 361/683 |
| 2005/0134156 | A1 * | 6/2005 | Fan | 312/223.2 |

* cited by examiner

*Primary Examiner* — Darnell Jayne
*Assistant Examiner* — Andrew Roersma
(74) *Attorney, Agent, or Firm* — Altis Law Group, Inc.

(57) ABSTRACT

A computer enclosure, includes a case and a power supply chassis secured in the case. The case includes a bottom wall and a rear wall. The bottom wall defines a securing slot. A first positioning member extends from the bottom wall. A securing tab extends from a bottom of the power supply chassis. The securing tab is configured to engage in the securing slot and prevent the power supply chassis moving in a first direction perpendicular to the case rear wall. The power supply chassis defines a first positioning hole configured for the first positioning member engaging therein to prevent the power supply chassis moving in a second direction perpendicular to the case bottom wall.

3 Claims, 3 Drawing Sheets

COMPUTER ENCLOSURE WITH POWER SUPPLY CHASSIS

BACKGROUND

1. Technical Field

The present disclosure relates to computer enclosures, and particularly, to a computer enclosure with a power supply chassis mounted therein.

2. Description of Related Art

A computer system, such as a personal computer or a server, generally includes a power supply mounted in a chassis along with other components and peripheral devices. The power supply chassis is secured to a conventional computer enclosure. Conventionally, several securing holes are defined in a rear wall of the computer enclosure, and several corresponding securing holes are defined in the power supply and aligned with the securing holes of the computer enclosure for fixing the power supply to the computer enclosure. The power supply is mounted in the chassis by a plurality of screws passing through the securing holes of the rear panel and the power supply, making it difficult and time consuming to replace or remove the power supply for repair.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
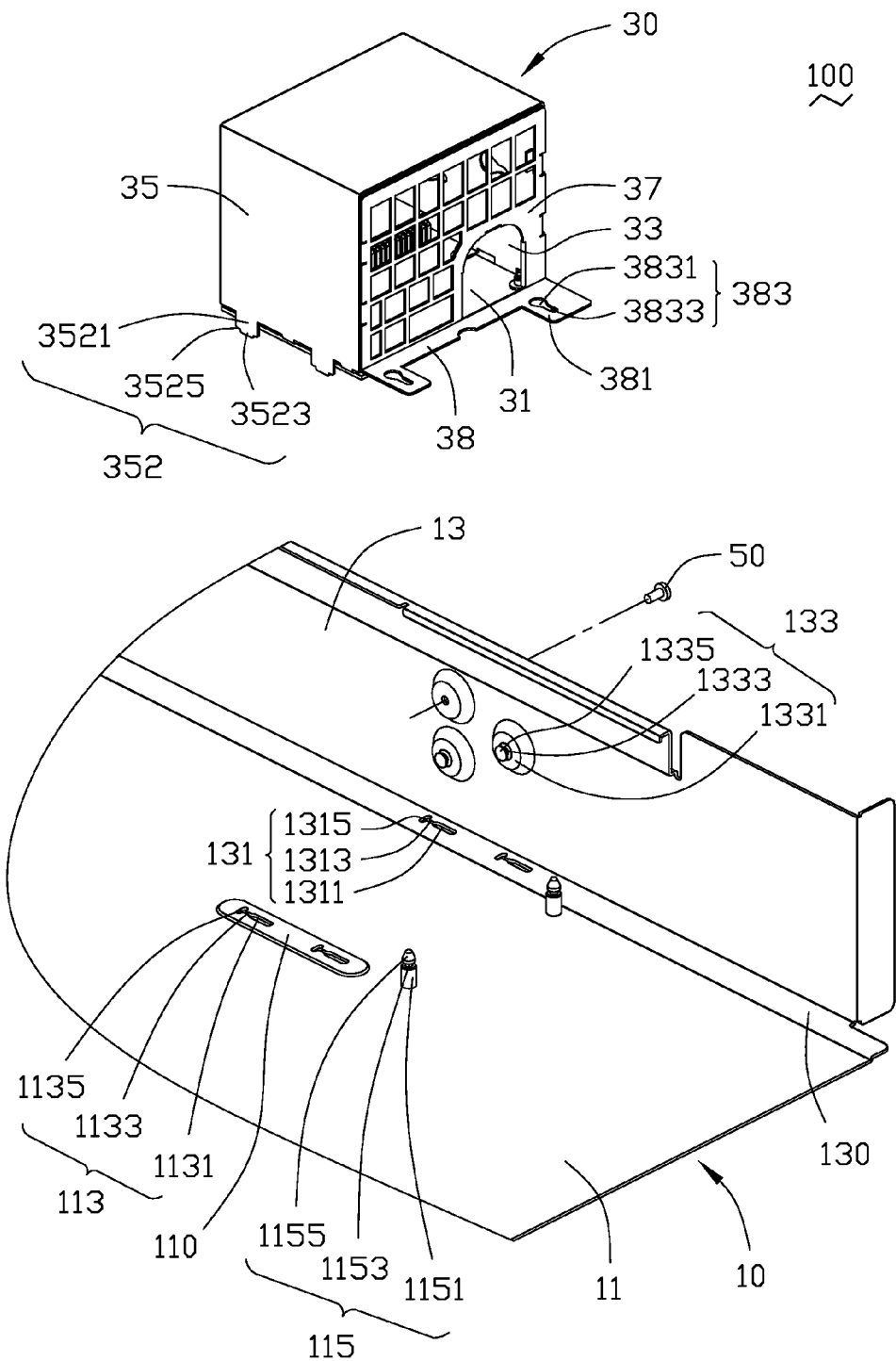
FIG. 1 is an exploded, isometric view of an embodiment of a computer enclosure, including a case and a power supply chassis.
Figure 2:
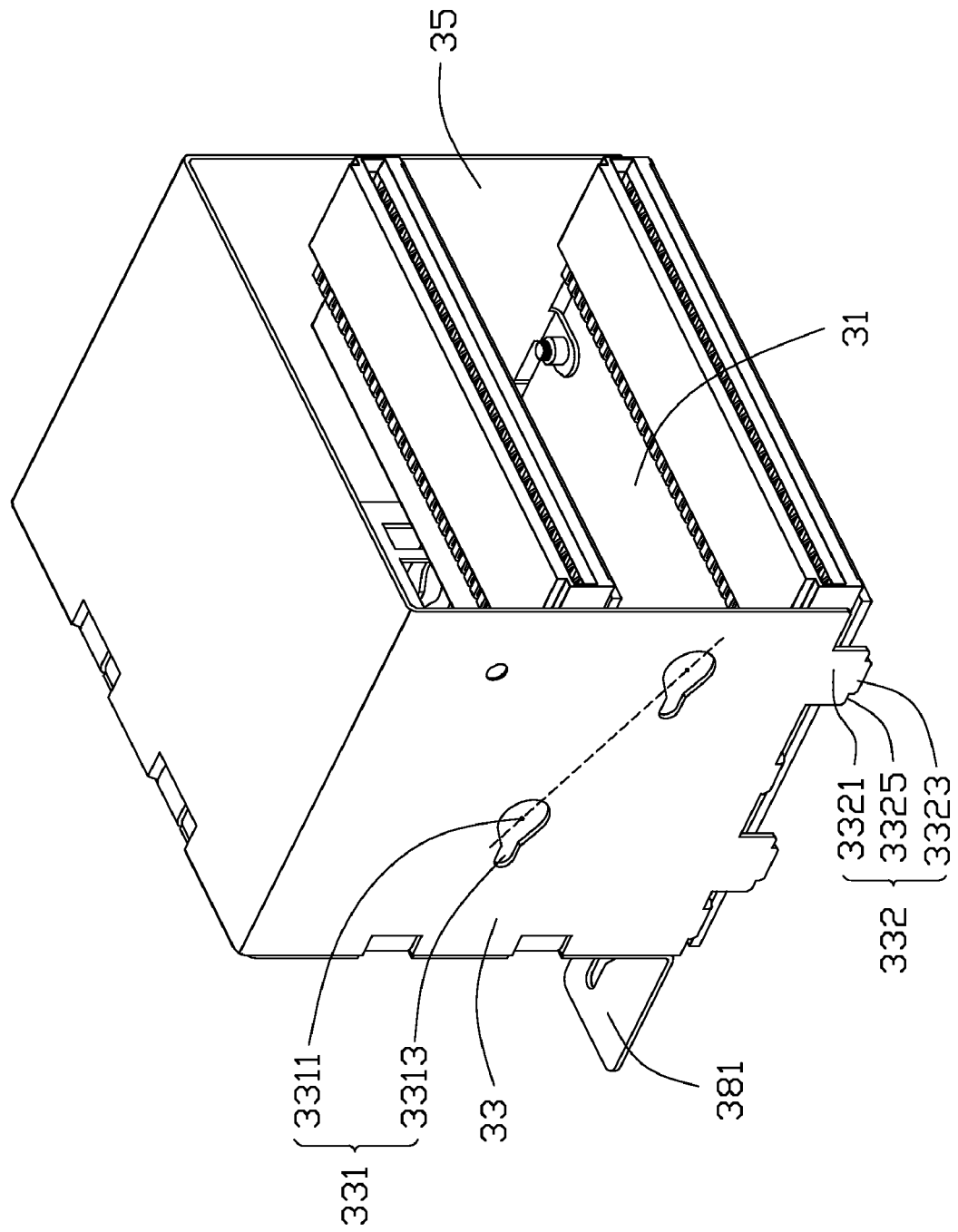
FIG. 2 is another isometric view of the power supply chassis of FIG. 1, but viewed from another aspect.

Referring to FIGS. 1 and 2, an embodiment of a computer enclosure 100 includes a case 10 and a power supply chassis 30.

The power supply chassis 30 includes a bottom wall 31, and a first sidewall 33 and a second sidewall 35 both perpendicular to the bottom wall 31. A U-shaped mounting plate 38 parallel to the bottom wall 31 extends from a bottom edge of the third sidewall 37. The mounting plate 38 includes two wings 381 extending from opposite two sides thereof. A first positioning hole 383 is defined in each wing 381. Each first positioning hole 383 includes an arc-shaped mounting portion 3831 and a longitudinal securing portion 3833 communicated with the mounting portion 3831. In another embodiment, the first positioning hole 383 may be defined in the bottom wall 31 of the power supply chassis 10.

The first sidewall 33 includes two first securing tabs 332 protruding downward from a bottom edge thereof. Each first securing tab 332 (shown in FIG. 2) includes a rectangular supporting base 3321 and a securing portion 3323 extending from a bottom thereof. A shoulder 3325 is formed at the bottom of the securing tab 332 adjacent the securing portion 3323. Two second securing tabs 352 protrude downward from a bottom edge of the second sidewall 35. Each second securing tab 352 has a generally same configuration as the first securing tabs 332, and includes a supporting base 3521, a securing portion 3523, and two shoulders 3253. Two second positioning holes 331 are defined in the first sidewall 33. Each second positioning hole 331 has a same configuration as the first positioning holes 383, and includes an arc-shaped mounting portion 3311 and a longitudinal securing portion 33. A broken line (not labeled) determined by centers of the arc-shaped mounting portions 3311 of the two second positioning holes 331 is oblique to the bottom wall 31 of the power supply chassis 30.

The case 10 includes a bottom wall 11 and a rear wall 13 perpendicular to the bottom wall 11. The rear wall 13 forms a bent plate 130 parallel to the bottom wall 11. The bent plate 130 connects the bottom wall 11 to the rear wall 13. Two first securing slots 131 corresponding to the first securing tabs 332 are defined in the bent plate 130. Each first securing slot 131 includes a longitudinal mounting portion 1311, a securing slit 1313 to communicate with the mounting portion 1131, and a transverse slot 1315. The width of the securing slit 1313 is substantially equal to the thickness of a corresponding first securing tab 332 so as to tightly clip the securing tab 332, and less than the mounting portion 1131. A supporting bar 110 protrudes upward from the bottom wall 11. Top surfaces of the supporting bar 110 and the bent plate 130 are positioned in a same plane above the bottom wall 11. Two second securing slots 113 are defined in the supporting bar 110. Each second securing slot 113 has a generally same configuration as the first securing slots 131, and includes a mounting portion 1131, a securing slit 1133, and a transverse slot 1135.

Two first positioning members 115 protrude from the case bottom wall 11. Each first positioning member 115 includes a cylindrical supporting post 1151 and a cone shaped blocking portion 1155. A neck portion 1153 connects the supporting portion 1151 to the blocking portion 1155. The case rear wall 13 forms two second positioning members 133. Each second positioning member 133 includes a supporting platform 1331, a blocking portion 1335, and a neck portion connects the blocking portion 1335 and the supporting platform 1331.

Figure 3:
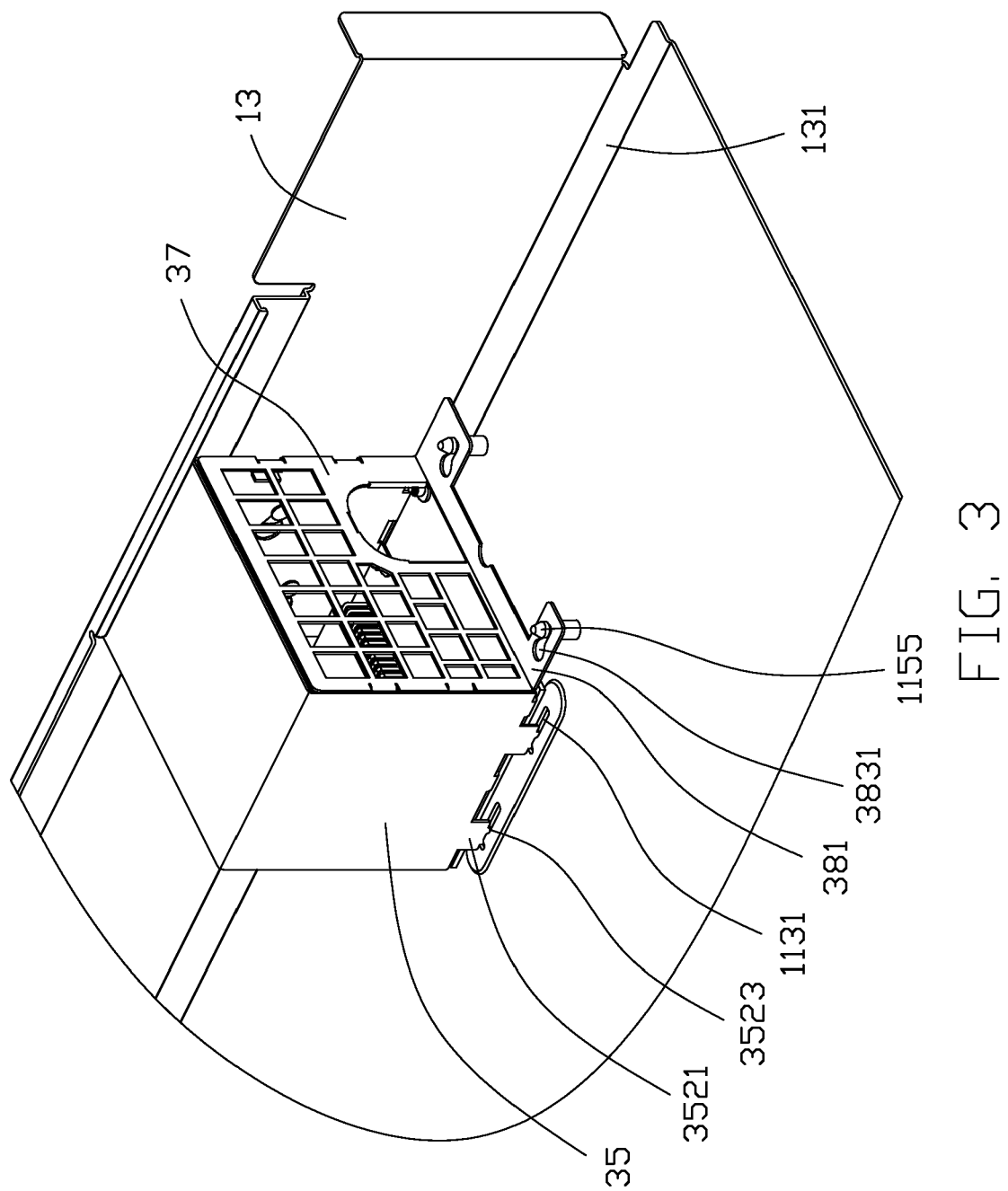
FIG. 3 is an assembled view of FIG. 1.

Referring to FIG. 3, in assembly of the power supply chassis 30 to the case 10, the first sidewall 33 of the power supply chassis 30 abuts on the case rear wall 13, with the neck portions 1335 of the first positioning members 133 accommodated in the mounting portions 3311. The first and second securing tabs 332 and 352 are aligned with the first and second securing slots 131 and 113 correspondingly. The securing portions 3323 and 3523 are inserted in corresponding mounting portions 1311 and 1131 of the first and second securing slots 131 and 113, and the neck portions 1155 of the second positioning members 115 are received in the mounting portions 3831 of the first positioning members 383.

Then, the power supply chassis is pushed to slide in the case 10 along a direction parallel to the case rear wall 13. The securing portions 3323 and 3523 engage in the securing slits 1313 and 1133 of the first and second securing slots 131 and 113 correspondingly, and are blocked by side edges of the transverse slots 1315 and 1135 to prevent the power supply chassis 30 from further sliding. One of the shoulders 3325 of each first securing tab 332 sits on the top surface of the bent plate 130, and one of the shoulders 3525 of each second securing tab 352 sits on the top surface of the supporting bar 110. Since the top surfaces of the supporting bar 110 and the bent plate 130 are positioned in the same plane above the bottom wall 11, a distance is defined between the power supply chassis bottom wall 31 and the case bottom wall 11. The neck portions 1333 of the first positioning members 133 engage in the securing portions 3313 of the first positioning holes 331, and the neck portions 1153 of the second positioning member 115 engage in the securing portions 3833 of the second positioning holes 383.

Thus, the first sidewall 33 of the power supply chassis 30 is blocked between the blocking portions 1335 and supporting platforms 1331 of the first positioning members 133, and the bottom wall 31 of the power supply chassis 30 is blocked between the blocking portions 1155 and the supporting posts 1151 of the second positioning members 133. Movement of the power supply chassis 30 along directions perpendicular to the case bottom wall 11 and the case rear wall 13 are limited. Then, a secondary fastener 50 is extended through holes (not labeled) of the case rear wall 13 and the first sidewall 33 of the power supply chassis 30 to secure the power supply chassis 30 to the case 10.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A computer enclosure, comprising:
a case having a case bottom wall and a case rear wall, the case bottom wall defining a securing slot and a first positioning member extending from the case bottom wall; and
a power supply chassis, a securing tab extending from a bottom of the power supply chassis, the securing tab engaging in the securing slot to prevent the power supply chassis from moving in a first direction perpendicular to the case rear wall; the securing tab is slidable in the securing slot along a direction parallel to the case bottom wall; the power supply chassis defining a first positioning hole, the first positioning member engaging in the first positioning hole to prevent the power supply chassis from moving in a second direction perpendicular to the case bottom wall;
wherein the securing slot in the case bottom wall comprises a securing slit and a mounting portion, a width of the securing slit is substantially equal to a thickness of the securing tab for tightly clipping the securing tab, and the mounting portion is configured for the securing tab to slide into the securing slit therefrom; and a supporting bar is defined in the case bottom wall, the securing tab comprises a supporting base, a securing portion protrudes from the supporting base and a shoulder formed at a bottom of the securing tab; the supporting base sits on the case bottom wall, the shoulder abuts on a top surface of the supporting bar and is substantially perpendicular to the supporting bar, and the securing portion inserted in the securing slit.

2. A computer enclosure, comprising:
a case having a case bottom wall and a case rear wall connected to the case bottom wall; a first positioning member located on the case bottom wall, and a second positioning member located on the case rear wall; and
a power supply chassis being secured to the case and having a chassis bottom wall and a first sidewall connected to the chassis bottom wall; wings extending from the chassis bottom wall defining a first positioning hole, and a second positioning hole defined in the first sidewall;
wherein the first positioning member is engaged in the first positioning hole, and the second positioning member is engaged in the second positioning hole; wherein a securing tab is extending from a bottom of the power supply chassis, a bent plate is located between the case bottom wall and the case rear wall, a supporting bar is located on the case bottom wall, top surfaces of the supporting bar and the bent plate are positioned in a same plane above the case bottom wall, so that the securing tab is supported on the case bottom wall to define a distance between the chassis bottom wall and the case bottom wall.

3. The computer enclosure of claim 2, wherein the case rear wall is substantially perpendicular to the case bottom wall.

* * * * *